United States Patent [19]

Poret et al.

[11] Patent Number: 4,674,089
[45] Date of Patent: Jun. 16, 1987

[54] IN-CIRCUIT EMULATOR

[75] Inventors: Mark Poret, Mesa; Jeanne McKinley, Chandler, both of Ariz.

[73] Assignee: Intel Corporation, Santa Clara, Calif.

[21] Appl. No.: 723,739

[22] Filed: Apr. 16, 1985

[51] Int. Cl.⁴ .................. G01R 31/28; G06F 11/30
[52] U.S. Cl. ............................ 371/25; 371/16; 364/200; 324/73 R
[58] Field of Search ............... 371/16, 18, 19, 24, 371/25; 364/200, 900; 324/73 R

[56] References Cited

U.S. PATENT DOCUMENTS

| | | | |
|---|---|---|---|
| 3,937,938 | 2/1976 | Matthews | 371/19 |
| 4,192,451 | 3/1980 | Swerling | 371/20 |
| 4,403,287 | 9/1983 | Blahut | 371/16 X |
| 4,433,413 | 2/1984 | Fasang | 371/25 |
| 4,455,654 | 6/1984 | Bhaskar | 371/20 |
| 4,571,677 | 2/1986 | Hirayama | 371/19 X |
| 4,583,179 | 4/1986 | Horii | 371/25 X |
| 4,590,550 | 5/1986 | Eilert | 371/16 X |
| 4,622,669 | 11/1986 | Pri-Tal | 371/25 |

Primary Examiner—Michael R. Fleming
Assistant Examiner—Robert W. Beausoliel, Jr.
Attorney, Agent, or Firm—Blakely, Sokoloff, Taylor & Zafman

[57] ABSTRACT

A circuit is disclosed which is implemented on the same silicon chip as a microprocessor to be utilized in a microprocessor system such as a microcontroller, which circuit allows a user to perform in-circuit emulation ("ICE") for the purpose of debugging the microprocessor system. The ICE circuitry comprises (i) capture logic which monitors the contents of the program address register and the internal data bus and various control lines of the processor; (ii) trace circuitry comprising a FIFO buffer which puts data from the capture logic to the output pins of the chip; and (iii) a content addressable memory and a software programmable logic array with emulation counters which together function as a finite state machine which performs the desired predetermined testing of the system.

11 Claims, 4 Drawing Figures

IN-CIRCUIT EMULATOR

BACKGROUND OF THE INVENTION

A highly desirable method for the debugging of any microprocessor based computer system is to access the system through the processor socket. With this technique, which is known as in-circuit emulation ("ICE"), the processor of the unit under test (the target) is removed and a second microprocessor (the host) is linked to the target through the processor socket of the target and performs an in-circuit emulation of the target processor. ICE technology, in general, has historically been plagued by three serious limitations.

The first limitation is that of having to control all ICE functionality externally from the target microprocessor chip. Target processor information must be routed off the microprocessor chip in order for the ICE control circuitry to have access to the data necessary to perform its functions. Information must then be routed back into the chip to control its operation. The amount of logic necessary to control the target processor chip and perform all required ICE functionality is substantial. The ICE circuitry cannot be physically located at the plug (i.e, the plug which contains the host/emulation processor and which is used in place of the target processor to debug the system). This necessitates the use of cables from the plug to the ICE control circuitry and buffers to drive these cables. This introduces delay and possibly loss of real time functionality.

The second limitation is cost. The costs associated with the use of ancillary logic, cables, and buffers manifests itself in higher product cost.

The third limitation is the manner in which trace/break operations must be performed. When the ICE control circuitry is required to initiate these operations, it must load a specialized control memory with code, which when executed by the target processor will put the processor in a desired state. The ICE control circuitry must then switch the source of the program code from normal program memory to this specialized control memory. While the processor is executing code from the specialized control memory, the ICE control circuitry must "stuff" whatever code is appropriate into the normal program memory. Program code source must then be switched back to the normal program memory. As a result of this peripheral activity which must take place, context switching cannot be performed in real time.

The present invention solves these limitations by utilizing a very large scale integrated in-circuit emulator ("VLSICE") concept. By incorporating all relevant ICE control circuitry on the processor chip, most of the foregoing limitations are eliminated. There is no longer any need to route target processor information off the chip for the ICE circuit to perform its trace/break and context switching functions. The extra cables and buffers are therefore no longer necessary. Real time trace/break operation can be achieved because the chip's state can be controlled internally without the need for a specialized control memory.

ICE technology has been hampered by four other more specific limitations. The first of these is the limited access which the ICE circuitry has to the processor's internal data during emulation mode. Typically, only the memory address lines (i.e., external memory when program memory shares the same space as data memory or program memory and external data memory if separate memories are used) are available to the environment outside of the chip. In order to cause a trace or break to occur, a programmer could use only a program memory address, opcode value, external data memory address, and/or external memory data value. This problem is further impacted by the inability of ICE circuitry to access internal data for a trace. Only the above-mentioned information plus the input/output ports are available as trace data.

The second limitation is the number of trigger conditions which can be used to cause a trace or break. Typically, ICE units utilize two registers each for trace and break trigger conditions. This restriction is necessitated by the limited board space available for ICE circuitry. Conditional arming and disarming of the specified trigger conditions does not currently exist. Thus, only relatively simple experiments can be performed.

The third limitation is the speed at which the ICE circuitry must operate. ICE circuitry must be capable of tracking a target processor's speed as it goes through a series of shrink processes. With each shrink, system clocking gets faster. Unless the ICE circuitry is designed with a sufficient speed margin, it will not be capable of keeping up with a shrunken chip operating at full speed.

The fourth limitation is the limited ability to debug multiprocessor configurations with multiple ICEs. In particular, processors which are targeted for distributed control applications necessitate the need for high functionality multi-ICE capability.

The present invention, as described below, eliminates these limitations by utilizing the VLSICE concept.

SUMMARY OF THE INVENTION

A circuit is disclosed which is implemented on the same silicon chip as a microprocessor to be utilized in a microprocessor system such as a microcontroller, which circuit allows a user to perform in-circuit emulation ("ICE") for the purpose of debugging the microprocessor system. In addition to the microprocessor, the chip includes the ICE circuitry and control circuitry which interfaces the ICE circuitry and the microprocessor. Although the disclosed ICE circuitry may be used in combination with any single chip microprocessor, it should be noted that the microprocessor discussed herein is a relatively complete microcomputer system which includes, in addition to an ALU, registers, accumulator, internal bus, etc., four on-board input/output ports, oscillator and clock circuitry, address space for external data memory and external program memory. Representative microprocessors which can be utilized in combination with the disclosed ICE circuitry are the Intel 8051 family of microcontrollers. It should be understood that the ICE circuitry is a debugging tool and once a particular microprocessor system design has been debugged, subsequent implementations of the microprocessor system do not include the ICE circuitry.

The ICE circuitry comprises (i) capture logic which monitors the contents of the program address register and the internal data bus and various control lines of the processor; (ii) trace circuitry comprising a FIFO buffer which puts data from the capture logic to the output pins of the chip; and (iii) a content addressable memory and a software programmable logic array with emulation counters which together function as a finite state machine which performs the desired predetermined testing of the system. All of the foregoing circuitry is implemented on a single silicon chip along with the microprocessor to be tested in the system and a control circuit which interfaces the ICE circuitry and the microprocessor. Included in the control circuitry is a mode controller for placing the ICE circuit in one of three modes namely, emulation mode, interrogation mode or halt mode.

By incorporating the ICE circuit on the same chip as the microprocessor to be tested in the system, the ICE circuit has easy access to all internal data used and/or generated by the microprocessor. In this manner, previously unavailable trace and break trigger conditions are available such as: opcodes, internal RAM addresses, special function register addresses, bit addressable register addresses, and data values. Of course, previously accessible program memory addresses, opcode data, external RAM addresses, and external RAM data are still available as trace and break trigger conditions. Additionally trace data can now include: internal RAM addresses and data, special function register addresses and data, bit addressable register addresses and data, and external RAM addresses accessed via direct memory access ("DMA"). Of course, previously accessible program memory addresses, opcode data, and external RAM addresses and data are still available as trace data.

All circuitry particular to the processor and ICE circuit are incorporated in the chip itself. This permits standardization of the interface which is presented to the remaining ICE circuitry, i.e. the control circuitry. Any microprocessor which utilizes the same standard interface can be connected directly to the same control box resulting in a universal ICE for microcontrollers.

Inasmuch as substantially all ICE circuitry is incorporated on the chip, it will now shrink along with the entire microprocessor circuit. This ensures speed compatibility. The control box need only be designed with a process (or even a few generations of processes) in mind to ensure full speed compatibility.

By incorporating the trace and break circuitry on the chip, numerous registers can be provided for trigger conditions. Silicon area is relative inexpensive for the added functionality which can be provided on the chip for greatly enhanced trace and break trigger conditions. In the present invention, up to eight levels of arming and disarming of trigger conditions are provided. In addition, counters are provided to allow multiple matches of trigger conditions before a trace or break is initiated. The present invention provides the user with the ability to trigger one, some or all of the possible data fields which comprise a trigger event. As a result, multi-ICE capability is incorporated through the use of these flexible trace-break triggering and arming conditions. Additionally, four external synchronization lines are provided to link together the trace-break functionality of individual ICE units.

Thus, through the architectural design of VLSICE, the present invention provides a standard interface to the control box, increases the functionality and flexibility of ICE, eliminates interface speed and board space limitations, and provides multi-ICE capability.

DETAILED DESCRIPTION OF THE INVENTION

A very large scale integrated in-circuit emulator ("VLSICE") is disclosed for enabling the debugging of a microprocessor based system using a technique known as in-circuit emulation ("ICE"). In the following description, numerous specific details are set forth such as specific word or byte lengths, etc. to provide a thorough understanding of the present invention. However, it will be obvious to those skilled in the art that the present invention may be practiced without such specific details. In other instances, well known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
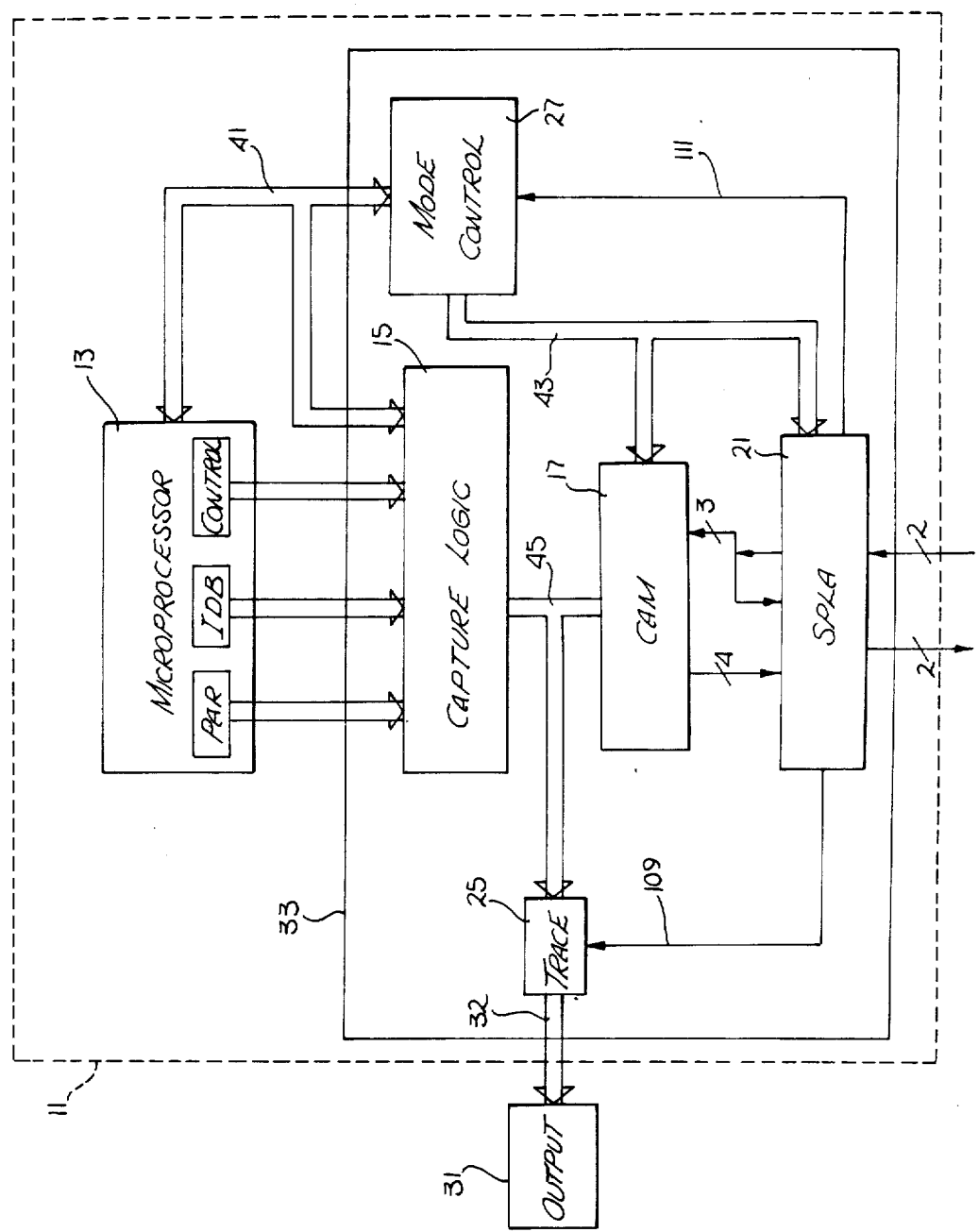
FIG. 1 is a block diagram of a VLSICE according to the present invention.

Referring first to FIG. 1, each of the elements of the present invention which are incorporated on a single silicon chip are shown within the shadow lines 11. That is, as shown in FIG. 1, the components comprising the VLSICE circuitry implemented on a single chip include a microprocessor 13, capture logic 15, content addressable memory 17, software programmable logic array 21, trace buffer 25 and mode control 27. Additionally, shown as an output from trace buffer 25 to bus 32 is output 31 which typically would be a plurality of pinouts connected to external trace memory in an ICE control box.

Microprocessor 13 comprises the microprocessor to be utilized in a microcomputer based system such as a mircrocontroller system. It is to be assumed that the microprocessor contains all the usual and well known microprocessor elements and functionality and performs in the usual manner. That is, microprocessor 13 constitutes a standard processor which is substantially unmodified for the purpose of being implemented on the VLSICE chip. The portion of the chip being disclosed and claimed herein constitutes the ICE circuit as shown within solid line 33 of FIG. 1.

Capture Logic

Capture logic 15 inputs data from the program address register ("PAR") sometimes referred to as the program counter ("PC"), the internal data bus ("IDB") and control lines from within the microprocessor. Additional inputs to the capture logic are from the microprocessor address and data bus, which data is placed on bus 41. Typically, as for example in the Intel 8051 family of microprocessors, the PC is 16 bits, the IDB is 8 bits and the ICE bus is 16 bits. The capture logic 15 comprises a set of latches which serve to monitor the processor by latching the PC, opcode, destination and source addresses, address space and data of each instruction executed by the processor. The foregoing data is latched by the capture logic each instruction cycle of the processor and passed through bus 45 to content addressable memory ("CAM") 17 and trace buffer 25. Trace buffer 25, which will be described more fully below, is basically a FIFO buffer which puts the data latched by the capture logic onto trace bus 32 which is coupled to output pins 31. The data placed on the output pins is then directed to an external trace memory for later processing.

Content Addressable Memory

CAM 17 produces an output for use by software programmable logic array ("SPLA") 21 which together function as a state machine to control the actual operation of the ICE circuitry. The CAM 17 is the section of the state machine which determines the status of the processor and compares it with a set of four possible word recognizers. Which set of four word recognizers used is determined by the state of the state machine. The results of the comparisons are latched by the SPLA and then used to determine the next state of the state machine.

In the preferred embodiment, for the Intel 8051 family of microcontrollers, the CAM memory is a 32 word by 73 bit static memory. It contains 32 word recognizers, each being 73 bits long. The CAM memory is loaded during the state machine download operation as described below. During download, the memory is addressable as 320 8 bit bytes. The CAM is divided into four sections, each providing an addressing capability of eight distinct sets of four word recognizers. The four CAMs run in parallel. The state of the state machine is used as a base address into the CAM memory.

A word recognizer is made up of eight slots each being 16 bits. However, not all bits in all the slots are used. The eight word recognizer fields are shown below and described with reference to FIG. 2.:

| Addr. Space & Compare Type | Data Mask | Dest. Addr. | Data | PC Comp. Type | Opcode Mask | PC | Opcode |
|---|---|---|---|---|---|---|---|
| 1 | 2 | 3 | 4 | 5 | 6 | 7 | 8 |

(Slot 1) Address Space and Address Compare Type—These fields are each 3 bits in length. The remaining 10 bits of this slot are unused.

Address Space—This field comprises three bits stored in address space register 51. Bits 7, 6 and 5 of the CAM word refer to Address Space bits 2, 1 and 0 respectively. It contains an encoded value which specifies to which processor memory address space the destination address stored in destination address register 53 belongs. The first bit indicates whether a bit address is being compared. The remaining two bits indicate data memory space. The possible encoded values are:

| bit | 7 | 6 | 5 | |
|---|---|---|---|---|
| | 0 | 0 | 0 | Illegal |
| | 0 | 0 | 1 | Internal RAM space |
| | 0 | 1 | 0 | Special function register space |
| | 0 | 1 | 1 | External RAM space |
| | 1 | 0 | 0 | Illegal |
| | 1 | 0 | 1 | Bit addressable internal RAM space |
| | 1 | 1 | 0 | Bit addressable special function register space |
| | 1 | 1 | 1 | Illegal |

Address Compare Type—This field is three bits stored in address compare register 55. Bits 4, 3 and 2 of the CAM word refer to conditions greater than ("GT"), equal to ("EQ") and less than ("LT") respectively as described in the table below. The three bits comprise an encoded value which controls how the destination address field is used in the magnitude comparator 57. The possible encoded values are (note that polarity is reversed in the following table):

| bit | GT 4 | EQ 3 | LT 2 | |
|---|---|---|---|---|
| | 1 | 1 | 1 | Disables compare word. A match will never occur. |
| | 1 | 1 | 0 | Actual destination address must be less than the destination address field in order to cause a match. |
| | 1 | 0 | 1 | Actual destination address must equal the destination address field in order to cause a match. |
| | 1 | 0 | 0 | Actual destination address must be equal to or less than the destination address. |
| | 0 | 1 | 1 | Actual destination address must be greater than the destination address field in order to cause a match. |
| | 0 | 1 | 0 | Actual destination address must be less than or greater than the destination address field in order to cause a match. |
| | 0 | 0 | 1 | Actual destination address must be equal to or greater than the destination address field in order to cause a match. |
| | 0 | 0 | 0 | Don't Care. This value causes an unconditional match in the destination address comparator. |

(Slot 2) Data Mask—This field is eight bits stored in data mask register 59. It contains a mask for the data value. The mask is used to force the matching of bits in the data stored in equality comparator 61. A "1" in any bit position forces a match in the corresponding bit position of the comparator 61. A Don't Care condition in the match of the entire data value occurs when the mask register 59 contains all "1"s. The upper eight bits of this slot are unused.

(Slot 3) Destination Address—This field is sixteen bits stored in destination address register 53. It contains the destination address to which the actual destination addresses in the instruction will be compared. The destination address can be any address in internal RAM space, external RAM space, special function register ("SFR") space, or bit addressable register space. Bit addresses are specified as a byte address (SFR or RAM) plus three bits to specify which bit within the byte is being accessed. The low byte in this case contains the byte address and the high byte contains the bit index.

(Slot 4) Data Value—This field is eight bits stored in data register 63. It contains the data which is the qualifier value for comparator 61. The upper eight bits of this slot are unused.

(Slot 5) PC Compare Type—This field is three bits stored in PC compare type register 65. It contains an encoded value which controls how the PC address field is used in the magnitude comparator 57. These bits specify that the PC being sought is less than, equal to, or greater than the value specified in the comparator 57. A "1" in the correct bit chooses which inequality is to be satisfied. Combinations of these bits yield less than or equal to, greater than or equal to, or don't care. A don't care is achieved by setting all three bits to "1". The remaining thirteen bits in this slot are unused.

(Slot 6) Opcode Mask—This field is eight bits stored in opcode mask register 67. It contains a mask for the opcode value. The mask is used to force the matching of bits in comparator 61. A "1" in any bit position forces a match in the corresponding bit position of the comparator. A don't care condition in the match of the entire data value occurs when the mask register contains all "1"s. The upper eight bits of the slot are unused.

(Slot 7) PC Address—This field is sixteen bits stored in PC register 69. It contains the PC address which is to be compared with the value of the PC in comparator 57.

(Slot 8) Opcode Value—This field is eight bits stored in opcode register 71. It contains the opcode to be compared against the instruction opcode in comparator 61. The upper eight bits of this slot are unused.

Figure 2:
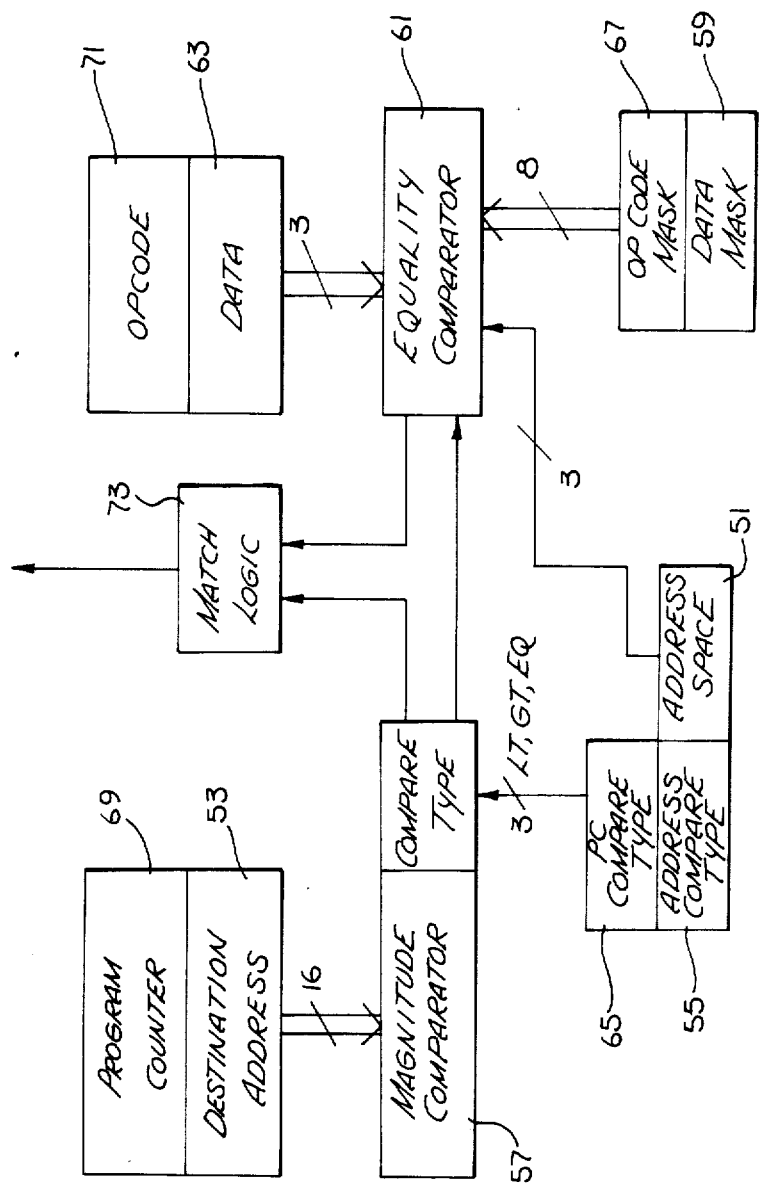
FIG. 2 is a block diagram of a single CAM comparator.

The block diagram circuit showed in FIG. 2 is one of four CAM comparators, each of which compares the opcode, PC address, source address, destination address, address space and data of instructions executed by the processor. The results of the compares in each of the four CAM comparators are ANDed together in order to determine whether or not the event executed by the emulation processor matches the conditions specified by the word recognizer. An event executed by the emulation processor is compared to a set of four word recognizers, one in each of the four CAM comparators. Each of these comparisons results in a match/no match condition and appears as the output of match logic 73. The results of the four comparisons comprises the four outputs from CAM 17 to SPLA 21 which will now be described with reference to FIG. 3.

Software Programmable Logic Array

One of the major objectives of the present invention is to implement a powerful and flexible trace/break mechanism on chip. This is accomplished by an eight-state microprogrammable finite state machine. The state machine consists of an eleven-input, eleven-output, sixteen AND-term SPLA, a thirty-two word by seventy-three bit CAM discussed above, two dynamically reloadable sixteen bit emulation counters and four external sync lines, two for input and two for output.

The state machine achieves its versatility through the programmability of each of its component parts. The SPLA can be microprogrammed such that any desired combination of inputs can produce any desired combination of outputs. As noted above, the CAM is completely programmable and contains thirty-two word recognizers. The emulation counters are dynamically preloadable to count any number of events from 1 to 65,536. Associated with each possible state of the machine is a set of four trace/break word recognizers. A match of none, one, some, or all of the four word recognizers will, along with the other state machine inputs, specify the next state of the machine and hence the next set of word recognizers.

The SPLA is the heart of the state machine. As noted above, it comprises eleven inputs, eleven outputs and sixteen AND-terms. It is dynamically programmable under software control. While a standard PLA could possibly be utilized in a VLSICE, the number of experiments which could be conveniently performed would be minimal. For example, if an EPROM were utilized as a PLA (e.g., EE PROM or UV PROM) after each experiment, the entire VLSICE chip would need to be reprogrammed at the expenditure of considerable time and effort. Full details of a preferred embodiment of an SPLA which may be utilized in the present invention is disclosed in co-pending U.S. patent application Ser. No. 702,646 filed Feb. 14, 1985.

Figure 3:
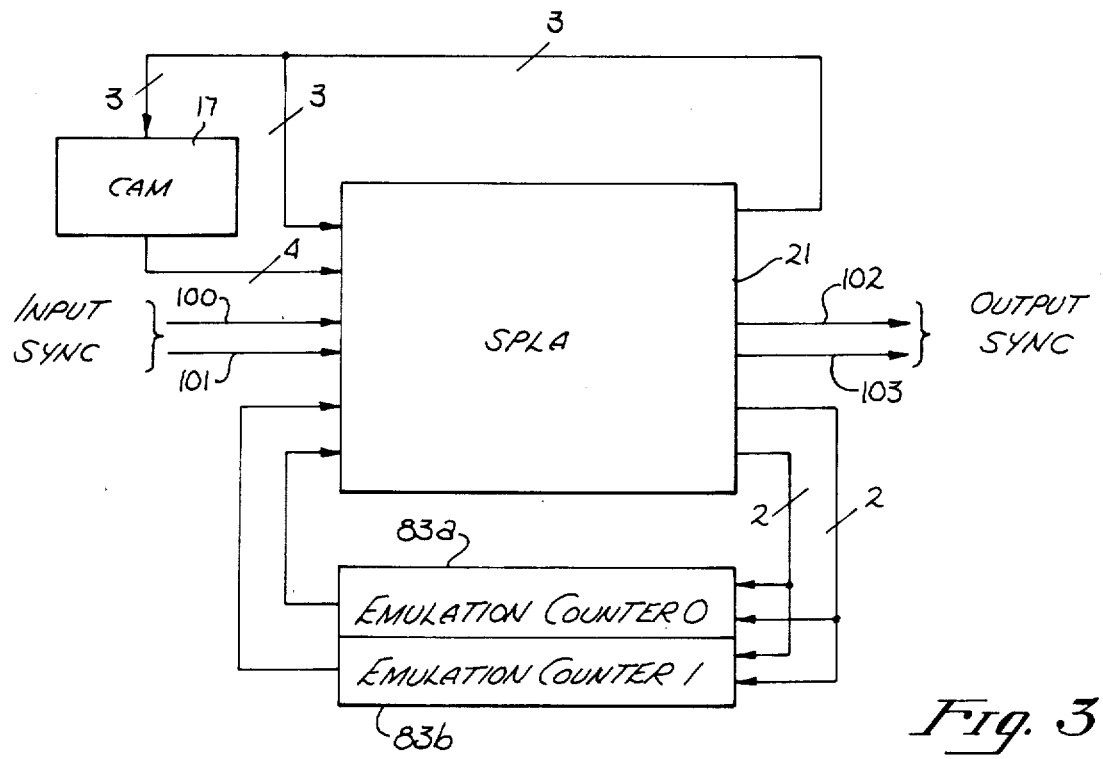
FIG. 3 is a block diagram of an SPLA as utilized in the present invention.

Referring now to FIG. 3, the inputs to and outputs from the SPLA will now be described. The SPLA inputs are:

1. The current state of the finite state machine itself (three bits);
2. The match conditions from the CAM (four bits);
3. The underflow signals from the emulation counters (two bits); and
4. Two external sync input lines (two bits).

The SPLA outputs are:
1. The next state of the finite state machine (three bits);
2. Preload emulation counters signals (two bits);
3. Decrement emulation counters signals (two bits);
4. Trace signal (one bit);
5. Break signal (one bit); and
6. Two external sync output lines (two bits).

The aforesaid eleven inputs to the SPLA are latched and input to a sixteen bit AND-plane of the SPLA. That is, for each level of the AND-plane, each of the eleven inputs to the SPLA comprises an input to a single programmable bit of an AND-term, the AND-term comprising a single output formed by ANDing together the output from each of the eleven programmable bits. In the preferred embodiment, the AND-plane comprises sixteen levels of AND-terms but, of course, as many, or as few, AND-terms as are needed for a particular application may be provided. The AND-terms are then used as inputs to another programmable stage namely, the OR-plane. That is, for each level of the OR-plane, each AND-term is input to a programmable bit the outputs of which are ORed together to form a single OR-term. In the preferred embodiment, there are eleven levels of OR-terms but, as is true with the AND-terms, as many or as few OR-terms as are desired may be provided.

The eleven OR-terms are used as inputs to the final programmable stage referred to as the output plane which determines the polarity of each output OR-term. By using the SPLA concept, the finite state machine can, as it must, be programmed for the desired functionality prior to every experiment. The high level language syntax to accomplish this can be represented as follows: machine state X equal IF (conditions) THEN (actions), where X equals machine state 0 thru 7 (depending upon whether each of machine state lines 0-2 is at a logical one level or logical zero level), the IF clause is any combination of AND, OR, or NOT of the SPLA inputs, and the THEN clause action is any combination of SPLA outputs.

Figure 4:
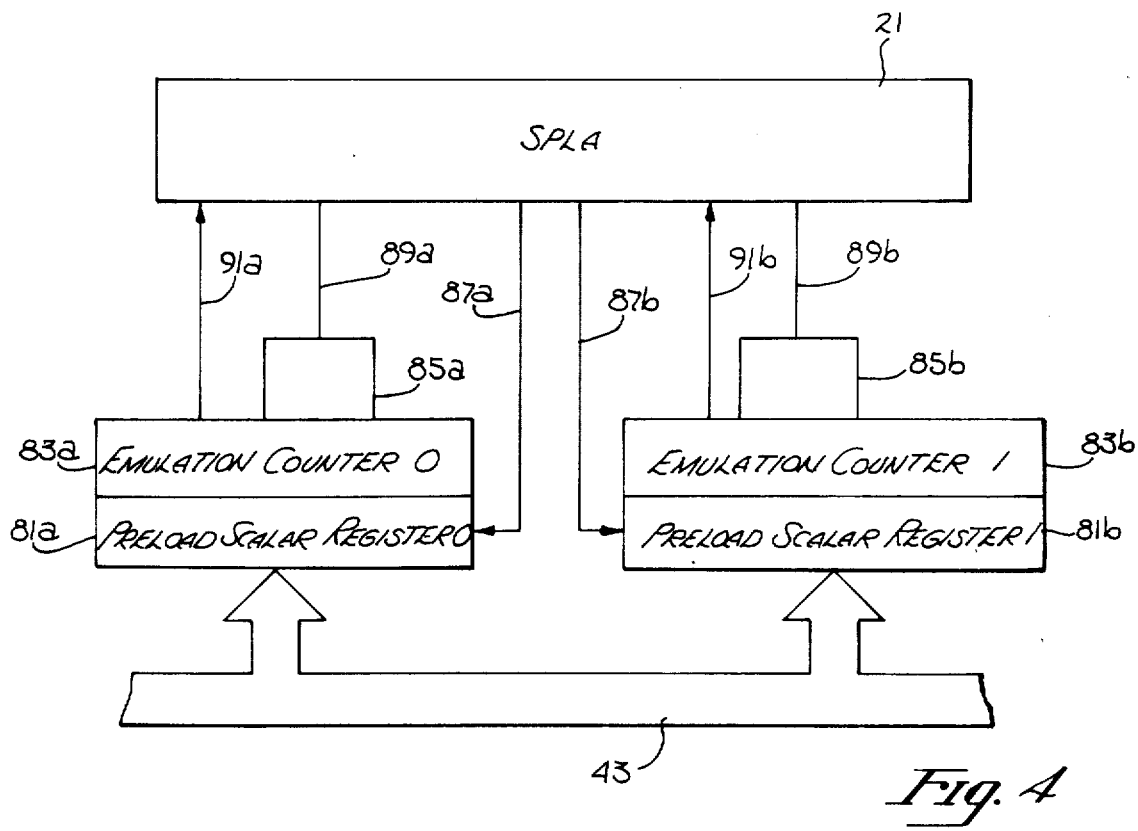
FIG. 4 is a block diagram of the emulation counters as utilized in the present invention.

Referring to FIG. 4, emulation counters 0 and 1 are two sixteen bit dynamically reloadable counters. They are used to count occurrences of events under the control of the SPLA. Each counter consists of three components: a preload scaler register 81 (81a and 81b), a counter register 83 (83a and 83b), and a decrementer circuit 85 (85a and 85b). The preload scaler registers 81 are loaded during the downloading of the state machine with data on bus 43. The counter registers 83 are loaded with the same value as the preload value when downloading the preload value. The preload scaler registers 81 and counter registers 83 have the same address. Both are loaded in a write operation, but only the counter registers may be read. When enabled by the SPLA, decrementer circuit 85 (85a and 85b) takes the count from the counter register (83a or 83b), decrements it by one, and loads it back into the counter register.

The SPLA has four outputs which control the emulation counters. Two of the outputs 87 (87a and 87b) enable the loading of the value from the preload scaler register 81a or 81b to the counter register 83a or 83b, i.e. one output for each of the counter registers. The other two outputs 89 (89a and 89b) enable each of the counters to decrement the values in their respective counter registers 83. When the count reaches one, the next decrement will cause an underflow signal on a corresponding one of lines 91a or 91b which is input to the SPLA.

For each counter, there is a bit in an SPLA output register (not shown) which selects whether the counter will decrement once per state machine cycle or once per processor cycle.

As noted above, referring again to FIG. 3 SPLA 21 has two inputs which originate outside the chip and two outputs which are routed directly off the chip, namely external sync lines 100–103. These sync lines allow ICE units in a multi-ICE configuration to communicate with one another in order to coordinate their trace/break functionality. A detailed description of multi-ICE capabilities of the present invention is set forth below.

Input sync lines 100 and 101 indicate to the finite state machine, the state of the other processors in a multi-ICE configuration. They are handled in the same manner as any other input to the SPLA. The microprogramming of the SPLA determines what effect the input sync lines will have on the state of the finite state machine.

Output sync lines 102 and 103 indicate to the other processors in a multi-ICE configuration the state of the finite state machine. By utilizing the input sync lines with the output sync lines thereby producing two common sync lines, all of the processors in a multi-ICE configuration can communicate with each other.

Trace Circuitry

Referring again to FIG. 1 trace buffer 25, which as noted above puts data latched by capture logic 15 onto output pins 31, comprises trace circuitry which is the part of VLSICE which outputs information about the instruction being traced onto trace bus 32. It also supplies the trace clock required by the ICE trace memory to latch in the trace data. The trace circuitry comprises a series of shift registers which collect information about an instruction and shifts the collected information out onto the trace bus 32 when a trace signal is asserted on line 109 by a condition programmed in SPLA 21 which becomes active.

A set of trace data is called a trace frame. A trace frame is made up of between one and five trace words, depending on the instruction. Each trace word is 31-bits long and contains an address/data pair, and information concerning this pair in nine slots. Each trace frame is associated with one instruction executed by the emulation processor. The format of a trace word is shown below.

into the memory location specified by the byte address in slot (3).

(Slot 3) PC or Address Low—This slot contains the low byte of an address or of the program counter.

(Slot 4) Source/Destination—This bit indicates whether the address/data pair in the word is considered a source or a destination in the instruction. A "1" indicates a source, while a "0" indicates a destination. This field is undefined in the first word of the frame.

(Slot 5) Bit Instruction—This bit is a "1" if the address is a bit address. This bit is undefined in the first word of a frame.

(Slot 6) Address Space—This field is two bits wide and indicates the address space of the address contained in that word. These bits are undefined in the first word of the frame. They are encoded as follows:

(00) Illegal
(01) Special Function Register Space
(10) Internal RAM Space
(11) External Data Space (Slot 7) Address Valid Bit—This bit indicates whether the address field is valid. A "1" indicates the field contains a valid address, while a "0" indicates it is undefined.

(Slot 8) Data Valid Bit—This bit indicates whether the data field is valid. A "1" indicates the field contains valid data, while a "0" indicates it is undefined.

(Slot 9) Opcode or Data—This slot contains the first byte of the opcode of the instruction or data in the instruction. Immediate data will appear as source data with an invalid address. Other operands will appear as part of the source and destination information.

By analyzing the output trace data, the entire microprocessor system can be debugged in a relatively efficient and cost effective manner.

Multi-ICE Capability

The present invention achieves its multi-ICE capabilities through the use of the two pairs of external sync lines 100–104, as noted above. These lines allow an ICE unit to trigger events in other ICE units. This capability is best described through examples. Three examples are given below.

(1) The simplest example is if one ICE unit breaks or traces, it causes the other ICE units to break or trace. This is accomplished by defining one sync line to be a global trace signal and the other to be a global break signal. The individual ICE units are connected to these lines in parallel. The SPLAs in each of the ICE units are then microcoded such that the sync lines, when asserted, will cause a trace or break. Thus, any ICE unit asserting one of the lines will cause a response in all ICE

| (1) 1ST Word | (2) PC or High | (3) Address Low | (4) Src. Dest. | (5) Bit | (6) Address Space | (7) Address Valid | (8) Data Valid | (9) Opcode Data |
|---|---|---|---|---|---|---|---|---|
| 1 bit | 8 bits | 8 bits | 1 bit | 1 bit | 2 bits | 1 bit | 1 bit | 8 bits |

(Slot 1) First Word of Frame—This bit, if it contains a "1", indicates that the current word is the first word of the frame and contains the program counter and opcode. All remaining words contain address/data pair information for the instruction and have a "0" in this bit. If this bit is a "1" and the address and data valid bits are "0", then the trace frame contains DMA information.

(Slot 2) PC or Address High—This slot contains the high byte of an address or of the program counter. For a bit instruction, this byte contains the three bit index units.

(2) The second example involves the interconnection of three ICE units. The scenario required is that ICE unit A achieves some state where it must trigger an event in ICE unit B. ICE unit B being thus triggered (armed), executes codes until it achieved some state where it must trigger an event in ICE unit C. This is accomplished by defining one sync line as the communication line between units A and B, and a second sync line as the communication line between units B and C. Unit A executes code until it reaches a state in which it must trigger unit B. It asserts the first sync line. Unit B changes state in response to the change in state of the first sync line. The state of unit B is now armed and it continues to execute code until it reaches a state in which it must trigger unit C. At such time, unit B asserts the second sync line and unit C changes state in response to the change in state of the second sync line.

(3) The third example is similar to example two except that one of the sync lines must be reserved as a global break line. This leaves only one sync line through which the three ICE units must communicate. For example, one sync line can be defined to be a global break signal as described in example one. In order to use the second sync line as a communication line, the ICE units' state machines must be microcoded as follows. Unit B must set one of its emulation counters to count to 0 from 1. Its state machine must decrement the counter when the second sync line is asserted. Unit C must set one of its emulation counters to count to 0 from 2. Its state machine must decrement the counter when the second sync line is asserted.

Unit A executes code until it reaches a state in which it must trigger B. Unit A asserts the second sync line. Units B and C decrement their emulation counters in response to the assertion of the second sync line. Because unit B's emulation counter was set to count to 0 from 1, the counter underflows thus causing unit B to change state. Unit C does not change state because its emulation counter is set to count from 2. The state of unit B is now armed. It continues to execute code until it reaches a state in which it must trigger unit C. Unit B asserts the second sync line. Unit C decrements its emulation counter in response to the change in state of the second sync line. Because unit C's emulation counter was set to count from 2, the counter underflows thus causing unit C to change state.

Mode Control

Referring again to FIG. 1, the only aspect of the ICE circuit as shown within solid line 33 not discussed is mode control 27. Inasmuch as the specific details of mode control 27 are highly dependent upon the structure of microprocessor 13, such details have not been set forth herein. However, such details are well within the scope of one skilled in the relevant art. That is, an appropriate controller can easily be built with knowledge of the structure of the microprocessor and knowledge of the structure of the ICE circuit as disclosed herein. As noted above, mode controller 27 places the ICE circuit in one of three modes namely, emulation mode, interrogation mode or halt mode. In the emulation mode, the microprocessor on the VLSICE chip functions like the target processor. That is, during real time emulation, the emulation processor fetches instructions from program code memory and executes them. Emulation begins at the address in an emulation start register and halts (i.e., breaks) either by user abort or on a condition set by the user in the SPLA which causes line 111 to be asserted. Of course, in emulation mode, trace data is collected for each instruction and output on a condition set by the user in SPLA 21.

In the interrogation mode, the user has direct control over the ICE circuit. In this mode, it is possible to:

(1) prepare the system for emulation by defining: (a) trace and break arming, disarming and trigger conditions; (b) emulation control bits; and (c) memory space mapping;

(2) examine the contents of the trace buffer;

(3) examine and/or modify the contents of any memory space; and (4) execute previously programmed ICE command macros.

While in interrogation mode, programs can be run in the microprocessor to place data on bus 41 which, through mode control 27 is then placed on bus 43 which loads CAM 17 and SPLA 21 with desired initial state.

In the interrogation mode, the ICE unit does not emulate the real time processing functions of the target processor. Interrupts are not serviced, serial port communications are not supported, timer functions are inhibited, the DMA has limited functionality and the trace and break circuitry is disabled The halt mode is the state the ICE unit assumes while switching from one mode to another. During halt mode, the ICE system downloads the ICE monitor memory with code to be executed by the processor during interrogation mode, the processor executes an orderly transition from one mode to another according to the contents of an emulation control register dedicated for use by mode control 27. Details of the emulation control register and other registers used by mode control 27 will be described below.

The emulation control register is an eight bit register which contains an emulation control byte. As noted above, it is assessable only during interrogation mode. The individual bits are described below:

Bit 0—Emulation Halt Bit. This bit controls the mode into which the emulation processor goes after exit from the halt mode. It is automatically cleared upon exiting halt mode so that after a break from emulation mode, the processor will always go into interrogation. This bit is cleared during system reset. Thus, from halt mode, when set, the processor goes to emulation mode and when cleared, the processor goes to interrogation mode.

Bit 1—Software Break. This bit will cause a break and enter the halt mode if it is set after being cleared during interrogation mode. To cause a break a "0" and then a "1" is written to this bit. This bit is cleared during system reset.

Bit 2—Emulator Test Mode. This bit will allow the SPLA to cycle during interrogation mode to aid in functional testing. The SPLA and its output latches are otherwise frozen during interrogation mode. This bit is cleared during system reset.

Bit 3—Emulator External Access Bit. This bit controls the operation of predetermined ports on the processor in interrogation mode. If set, the ports remain frozen throughout interrogation mode even when accesses are made to external memory addresses. If cleared the ports will respond normally to accesses to external memory. This bit is set during system reset.

Bit 4—User Program Memory Read Bit. When set, this bit causes external data memory reads during interrogation mode to be made from user program memory. This bit is cleared during system reset.

Bit 5—Enable VLSICE Register Accesses. This bit, when set, causes all external data fetches to be made from the "external" on-chip VLSICE register space during interrogation mode. This bit is cleared during system reset.

Bit 6—Disable DMA. When this bit is set during interrogation, the DMA is disabled. Entrance into interrogation mode sets this bit. The DMA is automatically disabled during interrogation until this bit is cleared. This bit is set during system reset.

Bit 7—Data Memory Accesses to Monitor. This bit will allow external data memory accesses during interrogation mode to be made to ICE monitor memory space. This bit is set during system reset.

In the preferred embodiment in addition to the emulation control register mentioned above, three additional temporary registers are dedicated for use by mode control 27 for saving and restoring the complete status of the processor during the setting up of experiments for emulation. Each of the four registers is a read/write special function register which is in addition to those used by the microprocessor. Of course, registers used by the microprocessor can also be used by the ICE circuitry. It should be noted that the four special function registers are assessable only during interrogation mode.

By implementing the ICE circuitry disclosed herein on a single silicon chip by utilizing well known very large scale integration techniques, the difficulties associated with debugging a microcomputer system using in-circuit emulation noted above are avoided.

Thus, a VLSICE chip has been described. Although specific illustrations have been provided to aid in an understanding of the invention, it should be understood that the disclosed invention can be practiced in conjunction with other processors than of the type contemplated herein. Additionally, changes may be made to such details as word lengths, bus widths and the like without departing from the scope of the present invention as defined in the claims. Furthermore, such details as the particular items of information input to and output from the VLSICE circuitry may be modified to suit a particular application without departing from the scope of the invention as set forth in the following claims.

We claim:

1. An integrated circuit in-circuit emulator for testing a microprocessor system including at least one microprocessor which forms a portion of said integrated circuit comprising:

capture logic means including a plurality of latches coupled to a program counter, internal data bus and control lines disposed within said microprocessor and to an address and data bus of said microprocessor, which latches store the data from said program counter, internal data bus, address and data bus and control lines, each clock cycle of said microprocessor, said capture logic means for storing predetermined data in a memory and comparing said predetermined data with said stored data generated by said microprocessor and generating an output signal whose value depends on the results of said comparison;

comparison means including a content addressable memory and at least one comparator for storing predetermined data in a memory and comparing said predetermined data with said stored data generated by said microprocessor and generating an output signal whose value depends on the results of said comparison;

logic means for receiving said output signal and selectively generating a trace signal and break signal depending upon the value of said output signal, wherein said content addressable memory is coupled to said logic means and stores said predetermined data, and said at least one comparator is coupled to said plurality of latches for comparing at least one of the opcode, program counter address, source address, destination address, address space and data of instructions executed by said microprocessor with a corresponding field of a memory location within said content addressable memory;

means for selectivily enabling said data generated by said microprocessor to be available externally to said integrated circuit depending upon the value of said trace signal; and means for controlling the mode of operation of said emulator depending upon the value of said break signal.

2. The emulator defined by claim 1 wherein said at least one comparator includes at least one mask register for forcing the matching of bits stored in said comparator, the value stored in said mask register being determined by a corresponding field of a memory location within said content addressable memory.

3. The emulator defined by claim 1 wherein said logic means comprises a programmable logic array.

4. The emulator defined in claim 3 wherein said programmable logic array is software programmable.

5. The emulator defined by claim 1 wherein said enabling means comprises a trace buffer coupled to said capture logic means for buffering data stored in said capture logic means for output to an external memory.

6. The emulator defined by claim 1 wherein said controlling means selectively places said emulator in one of an emulation mode, interrogation mode and halt mode.

7. The emulator defined by claim 1 wherein said at least one comparator includes a magnitude comparator coupled to a destination address register, said magnitude comparator for comparing an actual destination address of an instruction being executed with a destination address stored in said destination address register, and generating a signal when a predetermined match condition is met.

8. The emulator defined by claim 1 wherein said at least one comparator includes a magnitude comparator coupled to a program counter register, said magnitude comparator for comparing an actual program counter address for an instruction being executed with a program counter address stored in said program counter register, and generating a signal when a predetermined match condition is met.

9. The emulator defined by claim 1 wherein said at least one comparator includes an equality comparator coupled to an opcode register, said equality comparator for comparing an opcode stored in said opcode register with an opcode of an instruction being executed, and generating a signal if a predetermined match condition is met.

10. The emulator defined by claim 1 wherein said at least one comparator includes an equality comparator coupled to a data register, said equality comparator for comparing the data value stored in said data register with the data field of an instruction being executed and generating a signal if a predetermined match condition is met.

11. The emulator defined by claim 1 wherein said at least one comparator includes a magnitude comparator coupled to a program counter register and destination address register, and an equality comparator coupled to an opcode register and a data register, said magnitude comparator for comparing values in one of said program counter register and destination address register with corresponding fields in an instruction being exeucted and generating a signal if a predetermined match condition is met, said equality comparator coupled to an opcode register and a data register for comparing values in one of said opcode register and data register with corresponding fields in an instruction being executed, and generating a signal if a predetermined match condition is met.

* * * * *